US011619769B2

(12) United States Patent
Nagahama et al.

(10) Patent No.: US 11,619,769 B2
(45) Date of Patent: Apr. 4, 2023

(54) ADAPTER OPTICAL SYSTEM AND FOCAL LENGTH VARIABLE OPTICAL SYSTEM

(71) Applicant: MITUTOYO CORPORATION, Kanagawa (JP)

(72) Inventors: Tatsuya Nagahama, Kanagawa (JP); Yuko Shishido, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 168 days.

(21) Appl. No.: 17/109,569

(22) Filed: Dec. 2, 2020

(65) Prior Publication Data

US 2021/0173128 A1  Jun. 10, 2021

(30) Foreign Application Priority Data

Dec. 9, 2019 (JP) .............................. JP2019-222024

(51) Int. Cl.
*G02B 3/14* (2006.01)
*G02B 13/22* (2006.01)

(52) U.S. Cl.
CPC ............... *G02B 3/14* (2013.01); *G02B 13/22* (2013.01)

(58) Field of Classification Search
CPC ....... G02B 21/22; G02B 21/1322; G02B 3/14
See application file for complete search history.

(56) References Cited

U.S. PATENT DOCUMENTS

| 9,930,243 | B2 * | 3/2018 | Gladnick | ............... G02B 7/006 |
| 9,961,253 | B2 * | 5/2018 | Bryll | .................... H04N 5/2254 |
| 10,120,180 | B2 * | 11/2018 | Ben Ezra | ............. G02B 21/361 |
| 10,281,700 | B1 * | 5/2019 | Nahum | .................. G02B 7/102 |

FOREIGN PATENT DOCUMENTS

| JP | 6330070 B1 * | 5/2018 |
| JP | 2019-74722 | 5/2019 |

* cited by examiner

*Primary Examiner* — Christopher Stanford
(74) *Attorney, Agent, or Firm* — Greenblum & Bernstein, P.L.C.

(57) ABSTRACT

An adapter optical system, which is an optical system configured to guide reflection light reflected by an object and passing through an imaging lens to a liquid resonant lens, includes: a first lens unit removably disposed at a position where the reflection light passing through the imaging lens enters and constituting an image-side telecentric optical system; and a second lens unit disposed at a position where the reflection light passing through the first lens unit enters and constituting a finite correction optical system in combination with the liquid resonant lens.

3 Claims, 3 Drawing Sheets

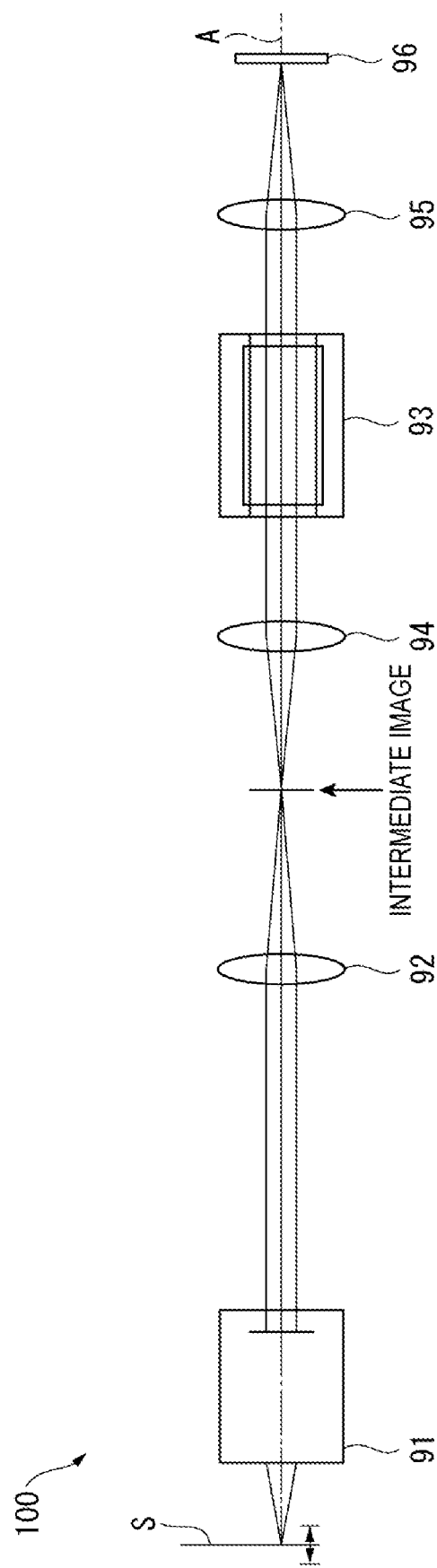

ADAPTER OPTICAL SYSTEM AND FOCAL LENGTH VARIABLE OPTICAL SYSTEM

The entire disclosure of Japanese Patent Application No. 2019-222024 filed Dec. 9, 2019 is expressly incorporated by reference herein.

TECHNICAL FIELD

The present invention relates to an adapter optical system and a focal length variable optical system.

BACKGROUND ART

A focal length variable optical system including a liquid resonant focal length variable lens (hereinafter, a liquid resonant lens) has been known (for instance, see Patent Literature 1: JP 2019-074722 A). In the focal length variable optical system, a refractive index of the liquid resonant lens periodically changes in response to an inputted drive signal, thereby causing a focus position relative to an object to periodically change.

In a case where a focal length variable optical system as described above is constructed in a microscope system, an optical system for forming a stable observation image is designed.

For instance, FIG. 3 shows a typical example of a focal length variable optical system to be constructed in a microscope system. A focal length variable optical system 100 shown in FIG. 3 includes: an imaging lens 91 configured to collimate light from an object S into a parallel beam; an imaging lens 92 configured to form an intermediate image with the parallel beam from the imaging lens 91; a first relay lens 94 configured to relay the intermediate image to enter a liquid resonant lens 93; and a second relay lens 95 configured to form an image on an image sensor 96 with light passing through the liquid resonant lens 93.

Meanwhile, at a work site where a focal length variable optical system used for a microscope system or the like is to be constructed, it is desired to use an off the shelf imaging lens in combination with a liquid resonant lens.

However, considering a fact that there are various types of imaging lenses, the off the shelf imaging lens should not always be suitable for constructing the focal length variable optical system shown as an example in FIG. 3. Specifically, while the imaging lens 91 in the focal length variable optical system 100 shown as an example in FIG. 3 is an image-side telecentric lens, an imaging lens in a typical microscope system is an object-side telecentric lens and an image lens in a typical camera is non-telecentric on both sides thereof.

Accordingly, at a work site where the focal length variable optical system is to be constructed, it is necessary, in order to use an off the shelf imaging lens, to design a relay optical system for connecting the imaging lens to a liquid resonant lens each time, thereby consuming time and effort.

Further, a supplier who supplies liquid resonant lenses has to prepare various types of adapter lenses for constituting a relay optical system so that a liquid resonant lens can be combined with various types of imaging lenses, which makes parts management complicated.

Such problems are common not only to a case where a liquid resonant lens is used but also to a case where any other optical component (for instance, a prism) requiring a relay optical system is used.

SUMMARY OF THE INVENTION

An object of the invention is to provide an adapter optical system configured to easily combine an optical component with various imaging lenses and a focal length variable optical system including the adapter optical system.

According to an aspect of the invention, an adapter optical system configured to guide reflection light reflected by an object and passing through an imaging lens to a predetermined optical component includes: a first lens unit removably disposed at a position where the reflection light passing through the imaging lens enters and constituting an image-side telecentric optical system; and a second lens unit disposed at a position where the reflection light passing through the imaging lens or the first lens unit enters and constituting a finite correction optical system or an infinity correction optical system in combination with the optical component.

In the adapter optical system according to the aspect of the invention, it is preferable that the second lens unit constitutes an object-side telecentric optical system.

According to another aspect of the invention, a focal length variable optical system where reflection light reflected by an object and passing through an imaging lens enters includes: a liquid resonant focal length variable lens; a first lens unit removably disposed at a position where the reflection light passing through the imaging lens enters and constituting an image-side telecentric optical system; and a second lens unit disposed at a position where the reflection light passing through the imaging lens or the first lens unit enters and constituting a finite correction optical system or an infinity correction optical system in combination with the focal length variable lens.

BRIEF DESCRIPTION OF DRAWINGS

FIG. 3 schematically shows a typical focal length variable optical system.

DESCRIPTION OF EMBODIMENT

Figure 1:
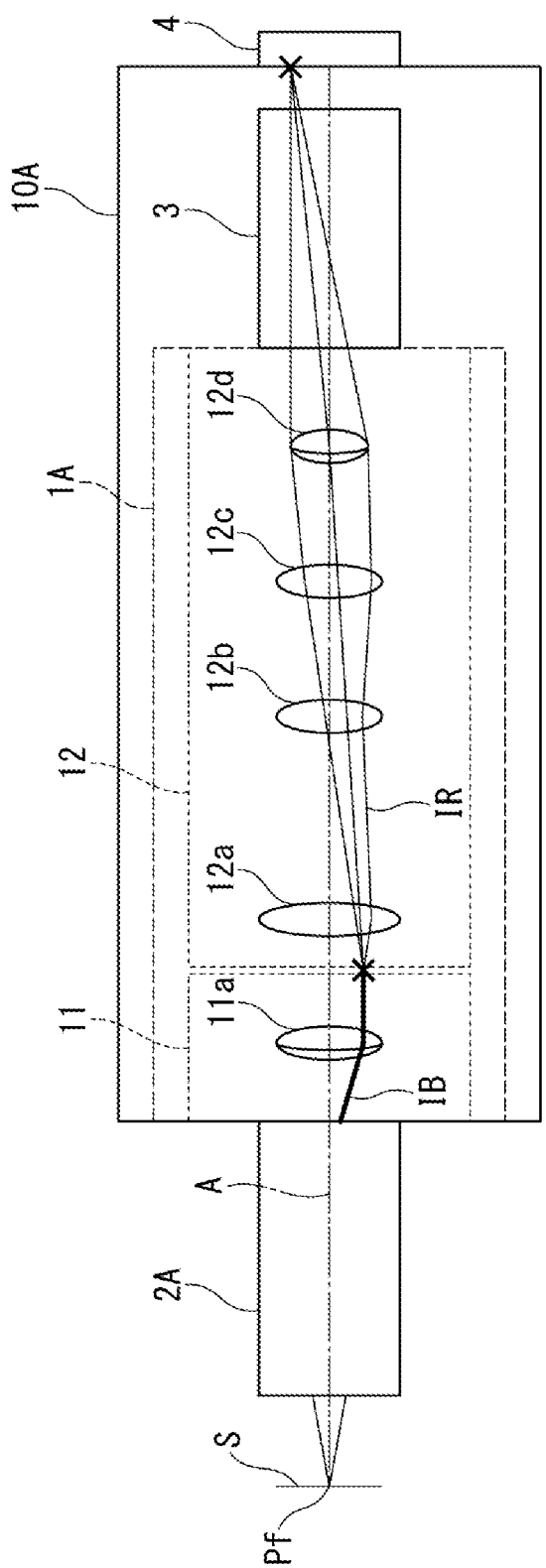
FIG. 1 schematically shows an example of a use of an adapter optical system according to an exemplary embodiment of the invention.
Figure 2:
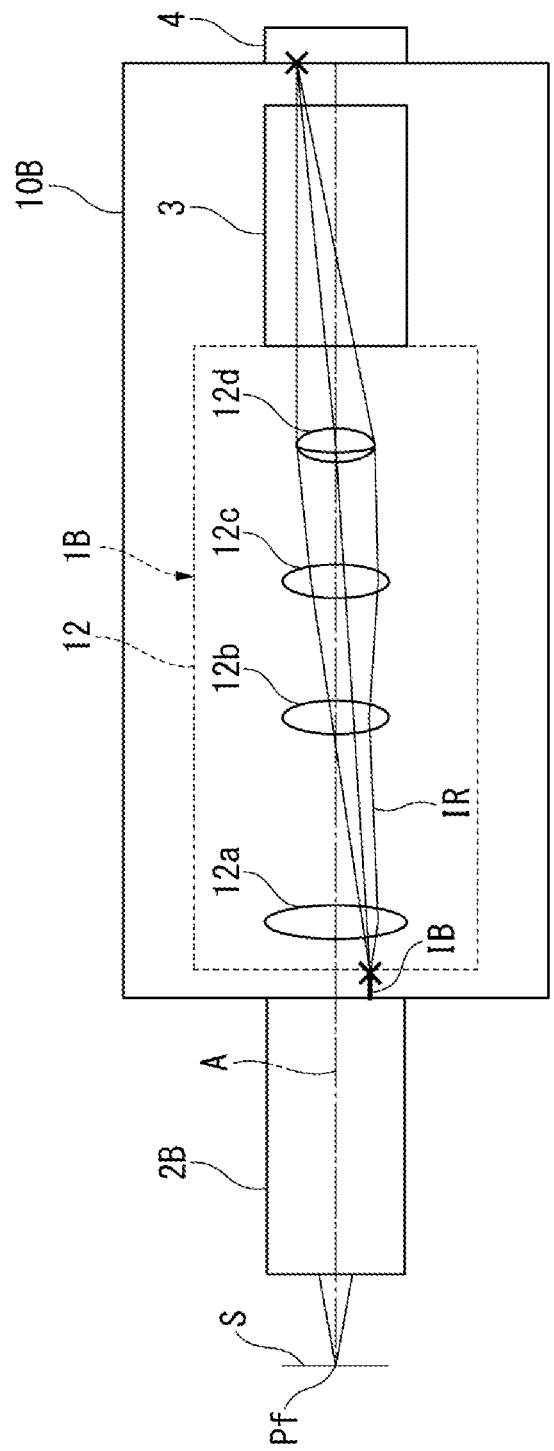
FIG. 2 schematically shows another example of the use of the adapter optical system according to the exemplary embodiment of the invention.

As shown in FIG. 1 or FIG. 2, adapter optical systems 1A and 1B of an exemplary embodiment are each an optical system used for combining a liquid resonant lens 3 (a liquid resonant focal length variable lens) with an imaging lens 2A or 2B.

The adapter optical systems 1A and 1B of the exemplary embodiment each include a second lens unit 12, and it is determined whether or not to add a first lens unit 11 to the second lens unit 12 according to the type of the imaging lens 2A or 2B.

Description will be made below on focal length variable optical systems 10A and 10B as examples of use of the adapter optical systems 1A and 1B.

Focal Length Variable Optical System 10A

As shown in FIG. 1, the focal length variable optical system 10A, which includes the adapter optical system 1A and the liquid resonant lens 3, is attached to the imaging lens 2A to be used in, for instance, an image detector configured to detect an image of an object S.

The imaging lens 2A, which includes one or more lenses, is an object-side telecentric lens or non-telecentric lens. That is, a principal ray on an image side of the imaging lens 2A is not parallel with an optical axis A. Examples of the non-telecentric lens include a camera lens, a microlens, and a CCTV lens.

The liquid resonant lens 3 includes a cylindrical casing filled with a liquid such as silicone and a cylindrical oscillator formed of a piezoelectric material. The oscillator, which is connected to an external lens controller (not shown) through a signal line while immersed in the liquid in the casing, is configured to oscillate in response to a drive signal (for instance, a sinusoidal alternating-current signal) inputted from the lens controller. When a frequency of the drive signal is adjusted to a resonance frequency, a standing wave is generated in the liquid inside the liquid resonant lens 3, causing a periodic change in a refractive index of the liquid.

A focus position Pf of light passing through the focal length variable optical system 10A, which is based on a focal length of the imaging lens 2A, periodically changes with a change in the refractive index of the liquid resonant lens 3.

The adapter optical system 1A is an optical system for combining the liquid resonant lens 3 with the imaging lens 2A. The adapter optical system 1A, which is disposed on the optical axis A between the imaging lens 2A and the liquid resonant lens 3, includes the first lens unit 11 and the second lens unit 12.

The first lens unit 11, which includes one or more lenses (in the exemplary embodiment, a lens 11a), is removably disposed between the imaging lens 2A and the second lens unit 12. The first lens unit 11, which constitutes an image-side telecentric optical system, is configured to convert the principal ray of light entering from the imaging lens 2A to be in a direction along the optical axis A, specifically, to be collimated to the optical axis A.

An optical design of the first lens unit 11 is determined according to an optical design of the imaging lens 2A. That is, the optical design of the first lens unit 11 is selected according to the imaging lens 2A such that the principal ray of the light passing through the imaging lens 2A can be converted to be in the direction along the optical axis A. Further, the first lens unit 11 may be adjustable in a position with respect to the direction along the optical axis A.

The second lens unit 12, which includes one or more lenses (in the exemplary embodiment, lenses 12a to 12d), is disposed on an object side of the liquid resonant lens 3. The second lens unit 12 constitutes an object-side telecentric optical system, forming a telecentric section between the second lens unit 12 and the first lens unit 11.

Further, the second lens unit 12 constitutes a finite correction optical system in combination with the liquid resonant lens 3, forming an image with light entering from a side of the first lens unit 11 at a position where the light has passed through the liquid resonant lens 3. It should be noted that an image sensor 4 of a camera of the image detector is disposed at an image formation position.

An optical design of the second lens unit 12 is selected according to the liquid resonant lens 3 irrespective of the type of the imaging lens 2A.

In the above-described optical system, in a case where the object S is irradiated with illumination light, reflection light reflected by the object S enters the adapter optical system 1A after passing through the imaging lens 2A. A principal ray of the reflection light is collimated to the optical axis A with the first lens unit 11, so that an image is formed through the second lens unit 12 and the liquid resonant lens 3.

It should be noted that FIG. 1 shows an example of an image formation beam IB and an image formation ray IR passing through the adapter optical system 1A.

Focal Length Variable Optical System 10B

As shown in FIG. 2, the focal length variable optical system 10B, which includes the adapter optical system 1B and the liquid resonant lens 3, is attached to the imaging lens 2B different in type from the above-described imaging lens 2A.

The imaging lens 2B is a both-side telecentric lens or an image-side telecentric lens. That is, a principal ray on an image side of the imaging lens 2B is parallel with the optical axis A.

The adapter optical system 1B has a configuration provided by removing the first lens unit 11 from the above-described adapter optical system 1A. That is, the adapter optical system 1B includes the second lens unit 12 disposed on the object side of the liquid resonant lens 3 in the same manner as the above-described adapter optical system 1A.

Likewise, for the second lens unit 12 in the adapter optical system 1B, an optical design according to the liquid resonant lens 3 is selected irrespective of the type of the imaging lens 2B.

In the above-described optical system, in a case where the object S is irradiated with illumination light, a principal ray of reflection light reflected by the object S is collimated to the optical axis A with the imaging lens 2B, so that an image is formed through the second lens unit 12 and the liquid resonant lens 3.

It should be noted that FIG. 2 shows an example of the image formation beam IB and the image formation ray IR passing through the adapter optical system 1B.

Effects

The above-described adapter optical system 1A includes the lens 11a, which is configured to collimate the principal ray of the reflection light passing through the imaging lens 2A to the optical axis A, in a form of the first lens unit 11, and the adapter optical system 1B can be configured by removing the first lens unit 11 from the adapter optical system 1A. It is thus possible to select whether to attach or remove the first lens unit 11 according to the type of the imaging lens 2A or 2B (whether or not the principal ray on a lens exit side is along the optical axis A). In a case where the imaging lens 2A, of which principal ray on the lens exit side is not along the optical axis, is used, the first lens unit 11 optically designed according to the imaging lens 2A is used. Meanwhile, in a case where the imaging lens 2B, of which principal ray on the lens exit side is along the optical axis, is used, the first lens unit 11 is not necessary.

Further, the above-described adapter optical systems 1A and 1B each include the lenses 12a to 12d, which constitute the finite correction optical system in combination with the liquid resonant lens 3, in a form of the second lens unit 12. For the second lens unit 12, the optical design according to the liquid resonant lens 3 is selected irrespective of the type of the imaging lens 2A or 2B due to the presence of the first lens unit 11.

Therefore, according to the exemplary embodiment, in a case where the focal length variable optical system 10A or 10B is to be constructed with use of the off the shelf imaging lens 2A or 2B, it is only sufficient to select the type and an attached/removed state of the first lens unit 11 according to the imaging lens 2A or 2B, thereby reducing effort and time for optical designing.

Further, in a case where the liquid resonant lens 3 is prepared such that the liquid resonant lens 3 can be combined with the various types of imaging lenses 2A and 2B, the second lens unit 12 is to be used in common. It is thus only sufficient to prepare the various types of first lens units 11 designed according to the various types of imaging lenses 2A and the common second lens unit 12, which results in facilitation of parts management.

Therefore, the use of the adapter optical systems 1A and 1B of the exemplary embodiment makes it possible to easily combine the liquid resonant lens 3 with the various imaging lenses 2A and 2B.

Further, in each of the adapter optical systems 1A and 1B of the exemplary embodiment, the second lens unit 12 constitutes the finite correction optical system in combination with the liquid resonant lens 3, thus making it possible to downsize the layout of the focal length variable optical system 10A or 10B without the necessity for another imaging lens.

Further, in the adapter optical systems 1A and 1B of the exemplary embodiment, the second lens unit 12 constitutes an object-side telecentric optical system. Thus, the principal ray of the reflection light exiting from the imaging lens 2B or the first lens unit 11 enters the second lens unit 12 while kept along the optical axis A, so that an image can favorably be formed with the reflection light passing through the second lens unit 12 and the liquid resonant lens 3.

Modifications

It should be noted that the scope of the invention is not limited to the above-described exemplary embodiment but modifications, etc. compatible with an object of the invention are included within the scope of the invention.

In the above-described exemplary embodiment, the second lens unit 12 constitutes the finite correction optical system in combination with the liquid resonant lens 3, but the scope of the invention is not limited thereto. That is, the second lens unit 12 may constitute an infinity correction optical system in combination with the liquid resonant lens 3. In this case, an imaging lens may be disposed as a third lens unit on an image side of the liquid resonant lens 3.

In the above-described exemplary embodiment, the liquid resonant lens 3 is used as an optical component of the invention but the scope of the invention is not limited thereto. For instance, any other optical component such as a prism is usable.

What is claimed is:

1. An adapter optical system configured to guide reflection light reflected by an object and passing through an imaging lens to a predetermined optical component, the adapter optical system comprising:
    a first lens unit removably disposed at a position where the reflection light passing through the imaging lens enters; and
    a second lens unit disposed at a position where the reflection light passing through the imaging lens and the first lens unit enters and constituting a finite correction optical system or an infinity correction optical system in combination with the optical component,
    wherein the first lens unit constitutes an image-side telecentric optical system in a region between the image-side of the first lens unit and the second lens unit.

2. The adapter optical system according to claim 1, wherein the second lens unit constitutes a separate object-side telecentric optical system.

3. A focal length variable optical system where reflection light reflected by an object and passing through an imaging lens enters, the focal length variable optical system comprising:
    a liquid resonant focal length variable lens;
    a first lens unit removably disposed at a position where the reflection light passing through the imaging lens enters; and
    a second lens unit disposed at a position where the reflection light passing through the imaging lens and the first lens unit enters and constituting a finite correction optical system or an infinity correction optical system in combination with the focal length variable lens,
    wherein the first lens unit constitutes an image-side telecentric optical system in a region between the image-side of the first lens unit and the second lens unit.

* * * * *